United States Patent [19]

Hsieh et al.

[11] Patent Number: 5,408,015

[45] Date of Patent: Apr. 18, 1995

[54] MIXED CHROMIUM CATALYST, AND ALKENE AND ALKYL ALUMINUM HYDRIDE-MODIFIED ZIEGLER CATALYST FOR MULTIMODAL HDPE

[75] Inventors: John T. Hsieh, Warren; Ann L. Pruden, Belle Mead, both of N.J.

[73] Assignee: Mobil Oil Corporation, Fairfax, Va.

[21] Appl. No.: 592,005

[22] Filed: Oct. 1, 1990

Related U.S. Application Data

[63] Continuation-in-part of Ser. No. 393,825, Aug. 14, 1989, abandoned, which is a continuation of Ser. No. 139,212, Dec. 29, 1987, abandoned.

[51] Int. Cl.$^6$ .............. C08F 4/22; C08F 4/654; C08F 10/02
[52] U.S. Cl. ................... 526/97; 502/113; 526/348.5
[58] Field of Search .......................... 526/97

[56] References Cited

U.S. PATENT DOCUMENTS

| | | | |
|---|---|---|---|
| 3,622,521 | 11/1971 | Hogan et al. | 526/352 |
| 3,647,772 | 3/1972 | Kashiwa et al. | 526/124 |
| 3,715,321 | 2/1973 | Horwath | 526/106 |
| 4,056,668 | 11/1977 | Berger et al. | 526/124 |
| 4,263,422 | 4/1981 | Lowery et al. | 526/97 |
| 4,329,253 | 5/1982 | Goodall et al. | 526/125 |
| 4,363,901 | 12/1982 | Kikuta et al. | 526/97 |
| 4,482,638 | 11/1984 | Fries | 526/903 |
| 4,681,924 | 7/1987 | Harris et al. | 526/904 |
| 4,863,886 | 9/1989 | Hsieh | 526/124 |
| 4,946,914 | 8/1990 | Hsieh | 526/106 |

OTHER PUBLICATIONS

Kirk-Othmen ENCYCLOPEDIA OF CHEMICAL TECHNOLOGY, Vol. 14, pgs. 631–633.

*Primary Examiner*—Edward J. Smith
*Attorney, Agent, or Firm*—Alexander J. McKillop; Malcolm D. Keen; Marina V. Schneller

[57] ABSTRACT

Multimodal high-density ethylene polymers or copolymers (HDPE) of broad molecular weight distribution suitable for blow-molding and films are prepared with a chromium oxide catalyst mixed with a MgO-supported Ziegler catalyst, modified with an alkene and with alkyl aluminum hydride, and with an MgO additive.

26 Claims, No Drawings

MIXED CHROMIUM CATALYST, AND ALKENE AND ALKYL ALUMINUM HYDRIDE-MODIFIED ZIEGLER CATALYST FOR MULTIMODAL HDPE

CROSS-REFERENCE TO RELATED APPLICATIONS

This is a continuation-in-part of application Ser. No. 393,825, filed on Aug. 14, 1989, now abandoned, the entire contents of which are incorporated herein by reference, which was a continuation of Ser. No. 139,212, filed on Dec. 29, 1987, now abandoned.

U.S. application Ser. No. 517,952, filed on Apr. 27, 1990, now U.S. Pat. No. 5,096,868, which is incorporated herein by reference, discloses and claims chromium based catalysts which are suitable for use as one component of the mixed catalysts of this invention.

BACKGROUND OF THE INVENTION

It is well recognized that for certain applications it is advantageous that ethylene polymers have a broad molecular weight distribution (MWD). For example, in blow molding of articles such as bottles, broad MWD polymers are desirable because they exhibit better impact strength and have superior environmental stress-crack resistance (ESCR) compared to polymers with narrow molecular weight distribution. Likewise, HDPE films with broad MWD are desirable because they exhibit good tear and impact properties.

Various expedients have been proposed to prepare ethylene polymers with broad molecular weight distribution modifications to the catalyst system such as described in many patents, for example U.S. Pat. Nos. 4,657,998 and 4,569,975.

Lowery, Jr. et al., U.S. Pat. No. 4,263,422, disclose a process for polymerizing alpha-olefins in the presence of independently supported transition metal catalysts, one of which is a catalytically active inorganic halide (e.g., $MgCl_2$ or $TiCl_3$) supported catalyst containing titanium or vanadium and another of which is an organic oxide-supported chromium-containing catalyst.

In accordance with this invention, novel catalysts quite different from those previously proposed are provided for preparing ethylene polymers and copolymer, particularly high density polyethylene (HDPE) with a multimodal and broad molecular weight distribution. The unique character of these catalysts is reflected in the general belief that the essential components, a magnesium oxide supported Ziegler catalyst and chromium catalyst component should not be combined because poisoning of the chromium catalyst would result.

SUMMARY OF THE INVENTION

A mixed catalyst comprising a chromium ethylene polymerization catalyst, a Ziegler ethylene polymerization catalyst and a small amount of an additive which is magnesium oxide (MgO) gives significantly broader molecular weight distribution polymers which are multimodal when used in the polymerization of ethylene, particularly high density ethylene homopolymer and high density compolymers of ethylene and higher olefins. The chromium catalyst comprises a chromium compound on an inert support and the Ziegler catalyst comprises an aluminum component and a titanium component on a magnesium oxide support. The Ziegler catalyst is modified with an alkene and an alkylaluminum hydride. The weight ratio of chromium catalyst to Ziegler catalyst is from 6:1 to 100:1 for maximum compatibility. The mixed catalyst contains about 1 to about 15% by weight (% wt.) of the additive, MgO, which is distinct and separate from the magnesium oxide used to support the Ziegler catalyst. In one process of the invention, the Ziegler catalyst comprises an organic acid-treated magnesium oxide support, a tri(lower alkyl)aluminum compound and titanium tetrachloride; and the chromium catalyst comprises chromium oxide coated silica which has been titanated with a tetraalkyl-titanate.

DETAILED DESCRIPTION OF THE INVENTION

A. Preparation of the Ziegler Catalyst Component

The Ziegler catalyst component is prepared by the following steps:

(1) Dried magnesium oxide support is treated with an organic acid in a solvent and dried;

(2) $TiCl_4$ is added to the acid treated magnesium oxide and the product is dried;

(3) The catalyst precursor is activated with an organoaluminum compound;

(4) A treatment is conducted with an alkene, preferably an 1-alkene having 3 to 12 carbon atoms, such as 1-hexene, to assist in rendering the Ziegler catalyst component more compatible with the chromium catalyst so that it does not poison the chromium catalyst;

(5) The product of step (4) is treated with aluminum hydride, such as diisobutyl aluminum hydride, and dried to complete the catalyst preparation.

The initial treatment of the MgO support with the organic acid is conducted with a molar excess of the MgO support. Preferably, the molar ratio of the organic acid to the MgO support is from 0.001 to 0.5, most preferably from 0.005 to 0.1.

The organic acid is desirably an aromatic carboxylic acid, including substituted benzoic acid containing alkyl or alkoxy substitutes. Lower alkoxy substituted benzoic acid, such as 2-ethoxybenzoic acid, has been demonstrated to be suitable. The acid is typically dissolved in an inert organic solvent, such as hexane, in which the MgO support is refluxed.

Particularly suitable compounds for use in step (3) have the formula

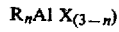

$$R_n Al\ X_{(3-n)}$$

in which R is alkyl, alkenyl, alkylaryl or arylakyl having 1 to 20 carbon atoms, X is hydrogen or halogen and n is 1, 2 or 3. Compounds in which R is alkyl of 1 to 6 carbon atoms are preferred.

B. Preparation of the Chromium Catalyst

The chromium catalyst can be prepared by the method described in U.S. Pat. No. 3,622,521, which is incorporated herein by reference.

Preferably, the chromium catalyst is prepared as described in a copending U.S. application Ser. No. 517,952, filed on Apr. 27, 1990.

In general, the chromium catalyst is prepared by:

(1) Drying or dehydrating the refractory oxide support material, e.g., silica, at a temperature of about 100° to about 500° C., preferably about 150° to about 300° C., and most preferably at about 200° C. for at least about 14 hours (hrs), preferably at least about 16 hours, and most preferably for about 15 hrs in a nitrogen atmosphere;

(2) depositing a chromium compound, e.g., chromium trioxide, onto the dried support;

(3) contacting the thus-obtained catalyst intermediate with at least one tetravalent titanium compound, e.g., tetraisopropyltitanate; and (4) purging the flammable components with nitrogen, preferably at about 325° C., and subsequently thermally activating the resulting solid, in an air atmosphere, at a temperature of at least about 800° C., preferably at least about 820° C., more preferably at about 820° to about 870° C., and most preferably at about 825° C. for at least about 10 hrs; preferably at least 14 hrs, and most preferably for about 16 hrs, to obtain an active catalyst composition.

The refractory oxide support material must have a relatively narrow pore size distribution. Thus, the refractory oxide support must have at least 75% of its pore volume in the pores of about 200 to about 500 Angstrom (Å) diameter, preferably at least 80% of its pore volume in the pores of about 250 to about 450 Å diameter, and most preferably at least 85% of its pore volume in the pores of about 250 to about 450 Å diameter.

C. Combining the Catalyst Components

The Ziegler and chromium catalyst components and the MgO additive can be combined in any suitable manner, such as by physical mixing prior to introduction to the reactor, or by separate feeding to the reactor in the desired proportions. The catalyst components should be present in a weight ratio of the chromium catalyst to the Ziegler catalyst of from about 6:1 to 100:1, preferably 18:1 to 31:1 for maximum compatibility. The amount of the MgO additive, other than the MgO used as the support for the Ziegler catalyst, is about 1 to about 15, preferably about 2 to about 10, and most preferably about 3 to about 5% wt. of the total mixed catalyst, i.e., Ziegler and chromium catalyst components and the MgO additive. The MgO additive is preferably treated in a conventional manner to remove physically adsorbed water, before it is combined with the Ziegler and chromium catalysts. Such treatment involves, e.g., placing the MgO into a vessel, evacuating the vessel, and introducing nitrogen into the vessel. This treatment can be repeated several times.

D. Polymerization

Ethylene can be homopolymerized or copolymerized with higher olefins using the catalysts prepared according to the present invention, by any suitable process. Such processes include polymerizations carried out in suspension, in solution or in the gas phase. Gas phase polymerization reactions are preferred, such as those conducted in stirred bed reactors and, especially, fluidized bed reactors.

The molecular weight of the polymer is controlled in the known manner, by using hydrogen. With the catalyst produced according to the present invention, molecular weight may be suitably controlled with hydrogen when the polymerization is carried out at relatively low temperatures, e.g., from about 30° to 105° C. This control of molecular weight may be evidenced by a measurable positive change in melt index ($I_2$) of the polymer produced.

The molecular weight distribution (MWD) of the polymers prepared with the catalysts of this invention, as expressed by the melt flow ratio (MFR) values ($I_{21}/I_2$), varies from about 120 to about 240, preferably about 140 to about 200, for HDPE products with a density of about 0.940 to about 0.970 g/cc. As recognized by those skilled in the art, such MFR values are indicative of a broad molecular weight distribution of the polymer. As is also known to those skilled in the art, such MFR values are indicative of the polymers especially suitable for blow molding and film applications.

The catalysts prepared according to the present invention are highly active and may have a typical activity of about 400–600 grams of polymer per gram of catalyst per 120 psi of ethylene per hour.

The linear polyethylene polymers prepared in accordance with the present invention may be homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. The most preferred comonomer is 1-hexene.

A particularly desirable method for producing polyethylene polymers and copolymers according to the present invention is in a fluid bed reactor. Such a reactor and means for operating it are described by Levine et al, U.S. Pat. No. 4,011,382, and Karol et al, U.S. Pat. No. 4,302,566, the entire contents of both of which are incorporated herein by reference, and by Nowlin et al, U.S. Pat. No. 4,481,301.

The catalysts prepared in accordance with this invention give HDPE polymers and copolymers having multimodal molecular weight distribution. Multimodal molecular weight distribution means that two or more peaks at different molecular weight are readily discernible in a plot of molecular weight against the relative proportions, such as obtained in gel phase chromotography analysis (GPC), of the polymer.

The described catalysts can be varied to achieve HDPE polymers having a wide range of molecular weights and molecular weight distribution. In particular, the high molecular weight tail can be greatly reduced without the loss of high molecular weight components to give commercially useful properties, such as low weight swell. Such resins are especially suitable for general purpose blow molding applications.

This invention is illustrated by the following non-limiting examples in which all parts are by weight unless otherwise specified.

EXAMPLE 1

A. MgO Supported Zeigler-Catalyst Preparation

MgO was dried overnight at 250° C. in flowing $N_2$. The dried MgO (320.3 g) was slurried in 377.2 g hexane, 12 cc 2-ethoxybenzoic acid (2-EBA) was added, refluxed 16 hours at 65° C., and then cooled to room temperature. Neat $TiCl_4$ (566 cc) was added to MgO slurry and refluxed overnight at 50° C. The mixture was cooled to room temperature and washed 5 times with fresh hexane (about 500 cc per wash).

Tri-n-hexyl aluminum (82 cc of 25 wt % in heptane) was added and the color changed to dark brown.

After drying at room temperature under $N_2$, 472.7 g of catalyst, which contained 1.35 mmol Ti and 0.18 mmol Al per gram catalyst was recovered.

B. Diisobutyl Aluminum Hydride Modification

One gram of the catalyst prepared in A. above was slurried in about 1.5 cc hexane and 0.5 cc/g of 1-hexene was added. The slurry was dried at room temperature to a powder. Sufficient hexane was added to slurry the powder and di-isobutylaluminumhydride (DIBAH) (1 cc of 25 wt % solution in heptane) per gram initial catalyst weight was then added. The catalyst dried at room temperature under flowing $N_2$. The final catalyst contained 0.98 mmol Ti and 1.22 mmol Al per gram catalyst.

EXAMPLE 2

Silica-Supported Chromium-Catalyst Preparation

Step 1 (Drying)

A chromium oxide coated silica (0.18% wt. Cr, calculated as chromium trioxide) having about 88% of its pore volume in the pore sizes of between 250 and 450 Angstroms (Crossfield SD-186) was introduced into a fluid-bed drying vessel maintained under nitrogen ($N_2$) at an ambient temperature and pressure. The temperature of the vessel was increased at the rate of 25° C./hour until it reached about 200°-210° C. The silica was dried in nitrogen atmosphere at about 200°-210° C. for 16 hours. It was then cooled to below 100° C. in 2–4 hrs.

Step 2 (Titanation)

30.0 grams of the product of Step 1 was charged to a 50 ml flask along with 250 ml of dry hexane. 10.5 ml of tetraisopropyltitanate was added at room temperature and the resulting brown slurry heated to 60°-65° C. under a vigorous nitrogen purge until the solid was dry (about 16-24 hrs). The hexane was removed in an oil bath with the temperature set at 65° C. over the period of 16 hours.

Step 3 (Activation)

Under good fluidization, the product of Step 2 was heated at 25° C./hr until it reached the temperature of 325° C. It was then heated at 325° C. for 2 hours in nitrogen; the nitrogen atmosphere was changed to air; the temperature was increased from 325° C. to 825° C. at 100° C./hr; and, it was heated for 16 hours at 825° C. in dry air. The temperature was then decreased to 350° C. as fast as possible. At 350° C., the air was again changed to nitrogen, and the temperature was decreased to ambient as fast as possible. The nitrogen purge was maintained for 1 hour at ambient temperature. The product was a yellow-orange catalyst which analyzed as follows:

Cr=0.18% wt.

Ti=4.0% wt.

EXAMPLE 3

Copolymerization of Ethylene and Hexene to Prepare HIC Resin

A mixed catalyst comprised of 0.05 g of the catalyst prepared in Example 1B, 0.05 g MgO (ambient $O_2$ and moisture evacuated and replaced by purified $N_2$), and 0.90 g of the Cr catalyst of Example 2 was prepared by adding the components to a Schlenck tube in a glove box and shaking to mix.

A one-gallon reactor was purged overnight with $N_2$ at 90° C. The reactor was treated with 2 cc of 25 wt % tri-ethyl aluminum (TEAL) in heptane for 30 minutes in 2 liters of hexane. The one gram of mixed catalyst described above was washed in with two liters isobutane. The temperature was raised to 102° C. Twenty psi ethylene and 10 psi $H_2$ were added, followed by 5 cc 1-hexene. The ethylene pressure was immediately raised to 120 psi (total pressure was 380 psig), and held one hour. From this run, 375 g of an ethylene-hexene copolymer having $I_2=0.27$, $I_{21}=41.3$, MFR=153, density=0.956 resin was obtained. Gel-phase chromotography (GPC) analysis showed the resin to be multimodal in MWD.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A gas phase process for polymerization of ethylene or copolymerization of ethylene and a higher olefin to a polymer having a broad molecular weight distribution comprising conducting the polymerization in the gas phase at temperatures ranging from 30° to 105° C. in the presence of a mixed catalyst comprising a Ziegler ethylene polymerization-catalyst and a chromium ethylene polymerization-catalyst in a weight ratio which gives a polymodal polymer having significantly broader molecular weight distribution (MWD) in the polymerization of ethylene than either catalyst alone, and a small amount of an MgO additive, which is about 2 to 10 weight % of the combined weight of, and;

wherein the mixed catalyst is characterized by a weight ratio of said chromium catalyst to said Ziegler catalyst is from 6:1 to 100:1; and wherein said Ziegler catalyst comprises an aluminum component and a titanium component on an organic acid-treated magnesium oxide support which has been modified by treatment with an alkene of 3 to 12 carbon atoms, which treatment is effective to render compatible with and with an alkylaluminum hydride wherein the aluminum component comprises an organoaluminum compound of the formula

in which R is alkyl, alkenyl, alkylaryl or arylalkyl having 1 to 20 carbon atoms, X is hydrogen or halogen and n is 3 and wherein the titanium component is titanium tetrachloride; and wherein said organic acid is a (lower-alkoxy)-benzoic acid, wherein the molar ratio of the organic acid to MgO is 0.001 to 0.5;

said chromium catalyst comprises chromium oxide coated silica which has been titanated with a tetraalkyltitanate; and recovering a polymer or copolymer having a density of 0.94 to 0.970 g/cc, and characterized by MFR ranging from 120 to 240.

2. The process of claim 1, in which said alkylaluminum hydride is di-isobutylaluminum hydride.

3. The process of claim 1, in which R is alkyl of 1 to 6 carbon atoms.

4. The process of claim 3, wherein the aluminum component is tri-n-hexyl aluminum.

5. The process of claim 2, in which R is alkyl of 1 to 6 carbon atoms.

6. The process of claim 5, wherein the aluminum component is tri-n-hexyl aluminum.

7. The process of claim 1, in which said alkene is 1-hexene.

8. The process of claim 2, in which said alkene is 1-hexene.

9. The process of claim 4, in which said alkene is 1-hexene.

10. The process of claim 6, in which said alkene is 1-hexene.

11. The process of claim 1, in which said tetralkyltitanate is tetraisopropyltitanate.

12. The process of claim 2, in which said tetralkyltitanate is tetraisopropyltitanate.

13. The process of claim 4, in which said tetralkyltitanate is tetraisopropyltitanate.

14. The process of claim 7, in which said tetralkyltitanate is tetraisopropyltitanate.

15. The process of claim 2, in which said (loweralkoxy)-benzoic acid is 2-ethoxybenzoic acid.

16. The process of claim 4, in which said (loweralkoxy)-benzoic acid is 2-ethoxybenzoic acid.

17. The process of claim 10, in which said (loweralkoxy)-benzoic acid is 2-ethoxybenzoic acid.

18. The process of claim 11, in which said (loweralkoxy)-benzoic acid is 2-ethoxybenzoic acid.

19. The process of claim 1, in which said chromium oxide coated silica has about 88% of its pore volume in the pore sizes of between 250 and 450 Angstroms.

20. The process of claim 19 in which the weight ratio of said chromium catalyst to said Ziegler catalyst is from 18:1 to 31:1.

21. The catalyst of claim 1 in which the molar ratio of the organic acid to the MgO is from 0.005 to 0.1.

22. The process of claim 1, wherein the Ziegler catalyst component is prepared by the following steps:
 (1) a dried magnesium oxide support is treated with said organic acid in a solvent and dried;
 (2) TiCl$_4$ is added to the acid treated magnesium oxide to form a product of step (2);
 (3) the product of step 2 is activated with said organoaluminum compound;
 (4) the activated product is treated with a 1-alkene having 3 to 12 carbon atoms, effective to render the Ziegler catalyst component compatible with the chromium catalyst and so that it does not poison the chromium catalyst, to form a product of step (4);
 (5) treating the product of step (4) with diisobutyl aluminum hydride.

23. The process of claim 19, wherein the chromium catalyst is prepared by:
 (1) heating silica, at a temperature of about 100° to about 500° C., in a nitrogen atmosphere, for at least about 14 hours;
 (2) depositing a chromium oxide onto the silica to form a catalyst intermediate;
 (3) contacting the catalyst intermediate with tetraisopropyltitanate; and
 (4) purging the flammable components with nitrogen, and subsequently thermally activating the resulting solid, in an air atmosphere, at a temperature of at least about 800° C., for at least about 10 hours.

24. The process of claim 23, wherein the Ziegler catalyst component is prepared by the following steps:
 (1) a dried magnesium oxide support is treated with said organic acid in a solvent and dried;
 (2) TiCl$_4$ is added to the acid treated magnesium oxide to form a product of step (2);
 (3) the product of step 2 is activated with said organoaluminum compound;
 (4) the activated product is treated with a 1-alkene having 3 to 12 carbon atoms, effective to render the Ziegler catalyst component compatible with the chromium catalyst and so that it does not poison the chromium catalyst to form a product of step (4);
 (5) treating the product of step (4) with diisobutyl aluminum hydride.

25. The process of claim 1 in which the polymerization is conducted in a gas-phase reactor and a mixture of said Ziegler catalyst, said chromium catalyst and said MgO additive is fed into the reactor.

26. The process of claim 1 in which the polymerization is conducted in a gas-phase reactor and said Ziegler catalyst, said chromium catalyst and said MgO additive are fed to the reactor separately.

* * * * *

UNITED STATES PATENT AND TRADEMARK OFFICE
CERTIFICATE OF CORRECTION

PATENT NO. : 5,408,015  Page 1 of 2
DATED : April 18, 1995
INVENTOR(S) : John T. Hsieh et al.

It is certified that error appears in the above-indentified patent and that said Letters Patent is hereby corrected as shown below:

Col. 6, line 33, after "comprising" insert --a)--.

Col. 6, line 34, after "and" insert --b)--.

Col. 6, line 38, after "alone, and" insert --c)--.

Col. 6, line 40, after "weight of" insert --a), b)-- and after "and" insert --c)--.

Col. 6, line 42, after "said" insert --b)--.

Col. 6, line 43, before "Ziegler" insert --a)--.

Col. 6, line 49, after "render" insert --a)-- and after "compatible with" insert --b)--.

UNITED STATES PATENT AND TRADEMARK OFFICE
CERTIFICATE OF CORRECTION

PATENT NO. : 5,408,015
DATED : April 18, 1995
INVENTOR(S) : John t. Hsieh, et al It is certified that error appears in the above-indentified patent and that said Letters Patent is hereby corrected as shown below:

Col. 8, line 26, "a" should read --the--.

Signed and Sealed this

Twelfth Day of December, 1995

Attest:

BRUCE LEHMAN

*Attesting Officer*     *Commissioner of Patents and Trademarks*